J. SUTTON.
Ash-Sifter.
No. 162,712.
Patented April 27, 1875.
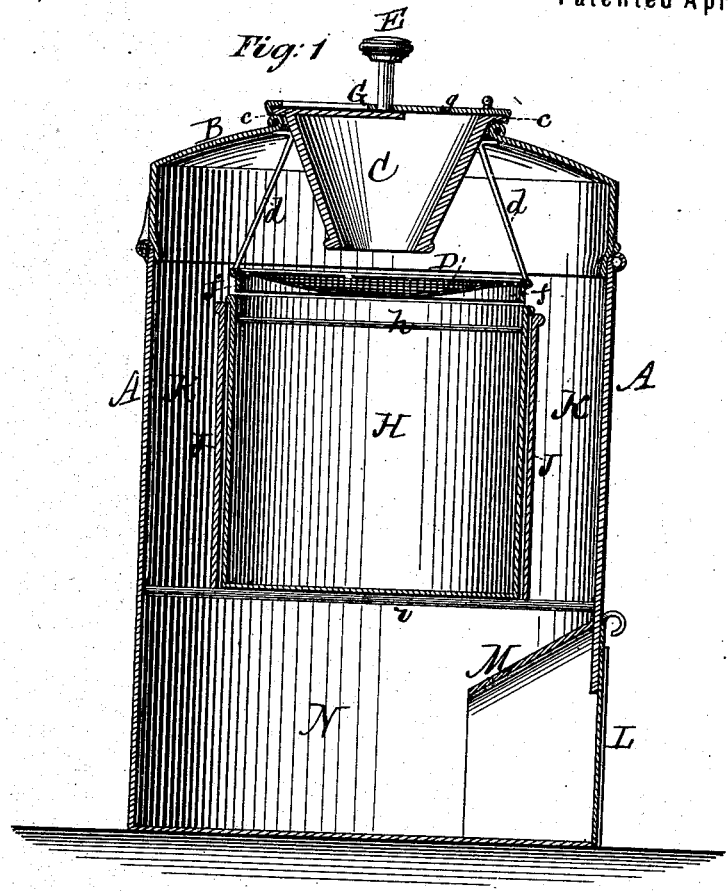
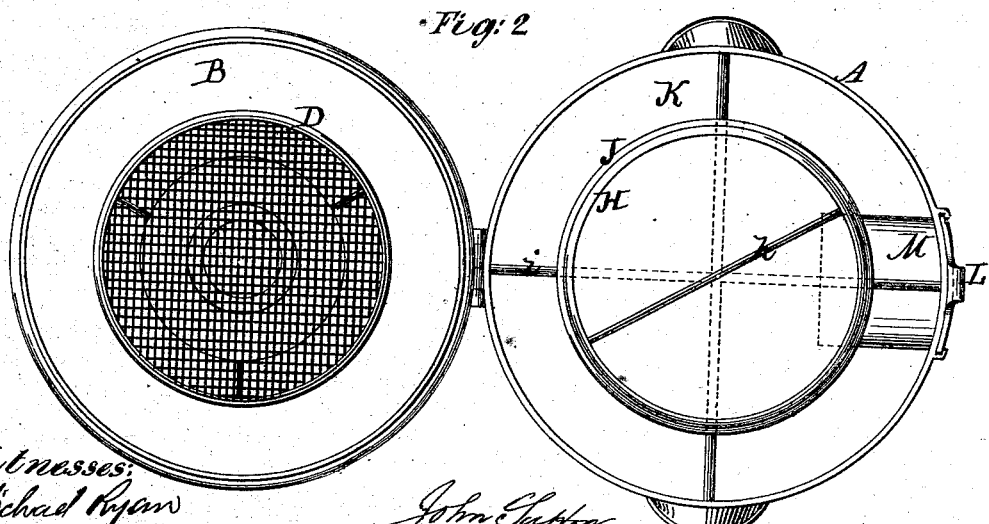

UNITED STATES PATENT OFFICE.

JOHN SUTTON, OF ISLIP, NEW YORK.

IMPROVEMENT IN ASH-SIFTERS.

Specification forming part of Letters Patent No. 162,712, dated April 27, 1875; application filed March 4, 1875.

*To all whom it may concern:*

Be it known that I, JOHN SUTTON, of Islip, in the county of Suffolk and State of New York, have invented certain Improvements in Ash-Sifters; and I do hereby declare that the following is a full, clear, and exact description of the same, reference being had to the accompanying drawing, forming part of this specification.

My invention relates to an apparatus which is designed more particularly for sifting coal-ashes, and separating the cinders from the fine ashes and dust, but which may be used for other similar purposes.

The invention consists in a novel construction and combination of parts, whereby the cinders are separated from the fine dust and ashes by centrifugal force, and deposited in an outer vessel or receptacle, and the ashes are deposited in a removable inner vessel, both operations being performed simultaneously.

In the accompanying drawing, Figure 1 is a central vertical sectional view of a sifter constructed according to my invention. Fig. 2 is a top view of the same with the cover thrown back.

A represents a vessel, which may be of cylindrical, square, or other suitable shape, and of metal, wood, or other suitable material. B is the lid or main cover of the vessel, which lid may be removable, or may be hinged to the vessel, as shown. In the center of the lid B is an opening, in which rests a conical hopper, C, which may be formed with a rim or flange, $e$, around its upper edge, to support it in the opening. Below the hopper is a sieve, D, which is attached to the hopper by means of rods or bars $d$, extending from the edge of the sieve to the sides of the hopper. The upper ends of these rods or bars $d$ may be turned outward, and bear against the under side of the lid B, around the edge of the opening, for the purpose of keeping the hopper in place. The sieve may be either flat, concave, or convex, and is formed without sides or rims extending upward, but with an ash-deflecting rim, $f$, extending downward from the under side, and tapering inward. The hopper and sieve, attached to each other, as described, are provided with means for imparting to them a rotary motion, either continuous or reciprocating. The means shown herein consists of a handle, E, attached to the hopper C, which handle may be a crank or a knob. The cover G of the hopper has one portion, $g$, removable, or arranged to swing or slide open, to allow the ashes to be placed in the hopper, and then be closed to prevent the escape of dust.

Immediately under the sieve D is an ash-receptacle, consisting of a vessel, H, provided with a handle or cross-bar, $h$, for handling or lifting it. This vessel H is placed concentrically in the vessel A, and is held in place by means of a centering device, which rests upon a grating or upon bars $i$, arranged a short distance above the bottom of the vessel A, as shown, in which case an annular space, K, is formed between the outer side of the vessel J and inner side of the vessel A, which annular space serves as a chamber for the reception of the cinders after they are sifted, and the vessel J serves as a shield, to prevent them from falling inward. The vessels H and J are, preferably, tapering in form, in order to facilitate the withdrawal of the vessel H, and to prevent the cinders from clogging in the annular space K. Near the bottom of the vessel A, on one side, is a door, L, surrounded by an arched passage, M, through which the cinders may be removed from the vessel.

The ashes to be sifted are placed in the hopper C, and the cover of the hopper is closed to prevent the dust from arising therefrom. The sieve is then rotated or oscillated, as before described, by which means the cinders are separated from the fine ashes and dust, and thrown centrifugally from the edge of the screen, falling through the annular space K to the space N in the lower part of the vessel A, from which they may be removed through the door L, the arch M serving to prevent the cinders from falling out when the door is opened. The fine ashes and dust, separated from the cinders, pass through the sieve and fall into the ash-receptacle H, which may be readily removed when necessary. In a large apparatus the annular space K may sometimes contain a large quantity of cinders, in which event the shield J will support them in place when the ash-receptacle is removed.

What I claim as new, and desire to secure by Letters Patent, is—

1. The combination of a sideless revolving or oscillating sieve and the inner and outer receptacles or vessels, having a space between them, substantially as and for the purpose described.

2. The combination, with a sieve and an inner and outer vessel, of a hopper attached to and revolving or oscillating with the sieve, substantially as and for the purpose described.

3. The combination, with the outer vessel A and inner vessel H, of the bottomless vessel J, serving as a guard and a centering device, substantially as herein described.

JOHN SUTTON.

Witnesses:
BENJAMIN W. HOFFMAN,
FRED. HAYNES.